April 23, 1963 K. LEHOVEC 3,087,099

NARROW WEB MESA TRANSISTOR STRUCTURE

Filed Jan. 2, 1959

INVENTOR.
KURT LEHOVEC
BY *Connolly and Hutz*
HIS ATTORNEYS

United States Patent Office 3,087,099

Patented Apr. 23, 1963

3,087,099

NARROW WEB MESA TRANSISTOR STRUCTURE

Kurt Lehovec, Williamstown, Mass., assignor to Sprague Electric Company, North Adams, Mass., a corporation of Massachusetts Filed Jan. 2, 1959, Ser. No. 784,632

1 Claim. (Cl. 317—234)

This invention relates to a transistor structure and, more particularly, to a transistor having a narrow web.

Electrochemical transistors such as the surface barrier transistor, the microalloy transistor, and the microalloy diffused transistor utilize a semiconducting body with a narrow web, produced by jet etching, and an emitter and collector electrode on opposite sides of the narrow web.

Another well-known transistor family utilizes the so-called mesa configuration which comprehends a flat-topped portion of the surface of a semiconducting body elevated above the substantially flat surrounding surface.

In this disclosure, novel semiconductor devices are described which combine the narrow web structure with the mesa configuration to obtain unusual and unexpected electrical properties.

It is an object of this invention to provide semiconducting devices with a narrow web and having a mesa configuration on one surface of the web, and with one electrode attached to the surface of the mesa and another electrode to the opposite surface of the narrow web.

In particular, it is an object of this invention to provide a structure of the above-mentioned type having at least one pn junction within the mesa substantially parallel to the surface of the mesa.

It is a further object of this invention to provide a structure containing a narrow web and a mesa configuration on one surface of the web with provisions to pinch off the mesa electrically from the remaining body of the semiconductor by extending the space charge layer from the electrode at the opposite surface of the web toward the mesa until it reaches the surface of the web from which the mesa is elevated.

These and other objectives of this invention will become more apparent upon consideration of the following description with reference to the accompanying drawing wherein.

Figure 1:
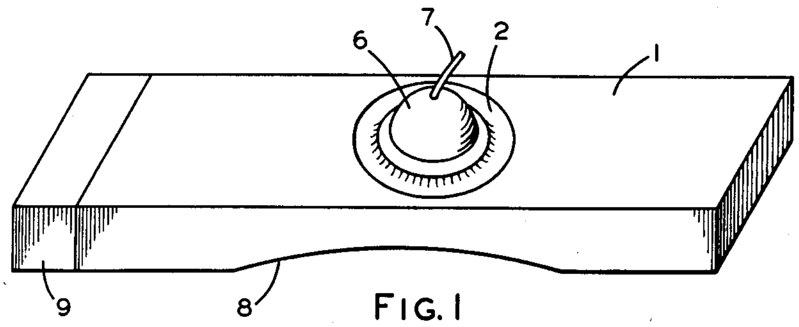
FIGURE 1 is a perspective view of a transistor constructed in accordance with this invention.

FIGURE 1 shows an embodiment of this invention in a transistor comprising a wafer 1 having a moat-like indentation 2 in its upper surface, an indentation 8 in its lower surface, and an ohmic contact 9 on one end.

Figure 2:
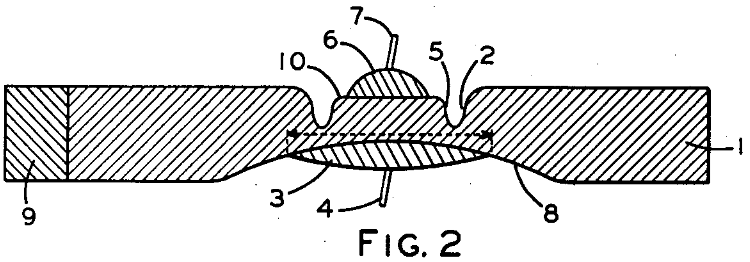
FIGURE 2 is a cross-sectional view of the transistor of FIGURE 1.

Referring to FIGURE 2, the transistor structure is described in terms of a pnp germanium device; the n-type germanium wafer 1, for example, of 0.5 ohm cm. resistivity has a jet etched indentation 8 in its lower surface and extending toward the opposite surface of the germanium wafer to within a distance of, for example, a few tenths of a mil. The dimensions in FIGURE 2 are not shown in their true relationship in order to accommodate the illustration of details. On the bottom of the indentation 8, a rectifying collector contact is provided by plating an indium-cadmium alloy 3 and soldering an electrical contact 4 to this indium-cadmium alloy. The indium-cadmium alloy may or may not be microalloyed with the germanium wafer 1. All these operations above described in connection with the illustration of FIGURE 2 are conventional in the production of surface barrier transistors or microalloyed transistors.

The surface opposite to the indentation 8 is provided with a mesa 5 by the indentation 2 and a rectifying emitter contact 6 on the top of the mesa. The emitter contact 6 is produced by jet plating an indium-gallium alloy and microalloying with the underlying body of the germanium. Contact wire 7 is soldered to the emitter contact 6. Contact 9 makes an ohmic contact with the germanium wafer at the left side as seen in FIGURES 1 and 2.

The lateral extent of collector contact 3, indicated by the broken-line arrows in FIGURE 2, should be greater than the diameter of circular moat 2 which is located on the opposite side of the narrow web of my transistor structure. In other words, the mesa 5 should be of such size as to be entirely within the extent of the collector contact 3 on the other side of the web. This relative size limitation is of importance to ensure that increasing the collector to base potential in the blocking direction will cause the space charge layer at the collector contact to first reach the bottom of moat 2 on the opposite side of the narrow web before the space charge layer reaches the emitter contact. As set forth more fully below, the space charge layer extending into moat 2 electrically insulates emitter lead 7 from base contact 9, so that the emitter current to the base is cut-off. An effect obtained by cutting off the emitter current is to decrease the collector current to provide negative collector current-voltage characteristics which are utilized advantageously in switching and oscillation applications.

The operation of the device utilizes the extension of the indentation 2 surrounding the mesa toward the collector 3. It is well known that there is a space charge layer adjacent to the collector contact which arises by the depletion of the majority carriers, that is, electrons, from the semiconducting body of wafer 1. This space charge layer extends with the application of an increasing voltage in the blocking direction between the collector lead 4 and the ohmic contact 9 to the germanium wafer 1. In the described example of n-type germanium, the potential in the blocking direction is such that the lead 4 is negative with respect to the contact 9. If the potential in the blocking direction is sufficiently high, the space charge layer will reach to the indentation 2 on the other side of the narrow web from the collector contact. When this occurs, the emitter lead 7 will be insulated electrically from the base contact 9 through a region of the collector space charge layer which is characteristically depleted of electrons from the semiconducting wafer 1. Accordingly, the resistance between the emitter contact 7 and the base contact 9 can be modified by the extension of the space charge and the potential between the collector contact 4 and the base contact 9; and, if this potential is sufficiently high, the emitter current to the base contact 9 can be cut off. The emitter current determines the collector current by means of injections of minority carriers from the emitter into the semiconducting body. Accordingly, the cut off of the emitter current decreases the collector current and the characteristic shown in FIGURE 3 results.

Figure 3:
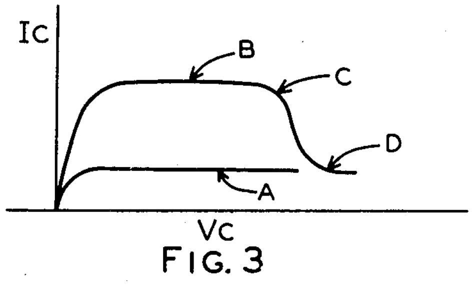
FIGURE 3 is a graphic representation of the effect of the space charge layer on the emitter current, by plotting the negative collector voltage against the collector current.

The characteristics in FIGURE 3 show the collector current plotted along the ordinate with the collector voltage plotted along the abscissa. The voltage is the negative voltage of the collector contact 4 with respect to the base contact 9. In FIGURE 3, the curve A shows the collector current as a function between the collector contact 4 and base contact 9 assuming that the emiter contact 7 is left open and no emitter current is flowing. The curve A may be characterized as a reverse or blocking characteristic of a semiconducting diode. The curve B—C—D refers to the collector current as a function of the voltage between collector contact 4 and base contact 9, with a constant potential in the forward direction inserted between the emitter and the base contact 9, that is, emitter contact 7 is made positive with respect to base contact 9, at a potential of a few tenths of a volt. The region B of the characteritsic of FIGURE 3 is a typical transistor characteristic and is obtained at collector potentials pertaining to a space charge layer at the collector of unsufficient width to extend to the indentation 2 of FIGURE 1. At the curve point C, the collector potential has become sufficiently high to cause a marked decrease of the current between emitter contact 7 and the base contact 9 due to the extension of the space charge layer almost to the indentation 2. At the curve point D, the space charge layer extends to the indentation 2 and the emitter contact is electrically cut off from the base contact, that is, there is almost no emitter current as in the case of the characteristic A. It will be noted that there is a negative current voltage characteristic between the points C and D which may be utilized in the well-known manner for switching applications and for self-generating oscillations.

Referring to the process by which the structure described above can be produced, we need to amplify only on the preparation of the mesa structure with the surrounding indentation since the other processes are quite conventional for surface barrier transistors and mesa transistors. The surrounding indentation can be prepared by a jet etch at sufficiently high current densities as is disclosed in my co-pending application Serial No. 784,600, filed January 2, 1959, now Patent No. 3,042,565. Alternatively, the mesa structure with the surrounding indentation can be produced by an electrochemical etch as follows. Insert the emitter surface of the semiconducting wafer into an aqueous KOH solution of .1 normal concentration and polarize the emitter wire 7 positive against the solution to draw a current of 20 milliamps. for a period of ½ second. While most of the current flows through the emitter wire, some current will flow from the electrolyte to the germanium adjacent to the emitter wire causing anodic etching of the germanium and creating the indentation 2. The rate of etching is a function of the illumination and increases also with a bias of the collector contact 4 in the forward direction against the base contact 9.

The invention has been described in terms of a homogeneous wafer, but its scope includes the use of a germanium wafer with graded base resistivity having more impurities near the emitter surface 10 than near the collector surface of indentation 8.

Figure 4:
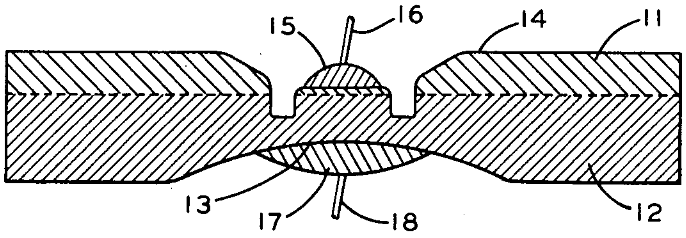
FIGURE 4 is a cross-sectional view of a junction semiconductor device employing the teachings of this invention.

The above-described structure utilizes the extension of a space charge layer across the entire web of the semiconducting body, and the following modification combines a narrow web with a mesa-like structure to produce the well-known configuration of an npnp diode. This structure is indicated in FIGURE 4. The structure indicates a semiconducting body having two regions of conductivity. One region 11 is of the n-type conductivity and another region 12 of the p-type conductivity. Such a wafer can be prepared conventionally by indiffusion of n-type impurities into a p-type germanium wafer. An indentation 13 is jet etched into the p-type region 12 of this wafer to leave a narrow web between the bottom of the indentation 13 and a surface 14 on the n-type region 11 of the wafer. The surface 14 is provided with a mesa at the region opposite to the indentation 13. The mesa is located in such a manner that the top of the mesa is still in the n-region, but the sloping walls of the sides of the mesa cuts through the pn junction between the n-region 11 and the p-region 12. Two rectifying contacts or junctions are prepared by jet plating and microalloying. One of these junctions is between the n-type layer 11 within the mesa and the plated indium-gallium alloy 15 to which a wire 16 is soldered. The other junction is between the p-type par tof the semiconducting body 12 and the plated antimony-lead layer 17 which has been microalloyed to the p-type region of the germanium and to which a wire contact 18 has been soldered. This provides an npnp configuration with junctions between the layer 15 and 11, 11 and 12, and 12 and 17. An advantage of this type of npnp junction over those produced by multiple indiffusion from one surface of a wafer is the narro wextension between the layers 15 and 17 causing a small electrical resistance in the "on" region. The structure of FIGURE 4 can be provided with a base contact that is a non-rectifying contact to the layer 11 and can then be used as a device of transistor-like characteristic.

This invention has numerous applications in the art of semiconductive structures and transistors. In these configurations, there are two staple regions of electrical operation; one of these regions is of high impedance and the other is of low impedance. These characteristics can be utilized in producing a device which is a current switch or a storage element.

Another advantage is found in the fact that light of suitable wave length will influence the electrical properties of the structures of this invention such as the structure in the modification of FIGURE 4. As a result, these structures can be used as photoelectrical cells. Further advantages are found in the isolation of the rectifying junctions in the mesa as unusual operating characteristics result from the combination of this isolation into semiconductive devices. As indicated above, the negative current contact is useful in switching operations, the generation of oscillation, and other operations conducted in electrical circuitry.

The above descriptions have set forth illustrative embodiments. It will be understood, however, that the invention is not limited to the terms of the described pnp germanium device or to an npn germanium device, but includes within the scope of the invention other devices and other semiconducting materials than germanium such as silicon and intermetallic compounds. It will be seen that the modifications and variations of the invention have been set forth for the purpose of illustrating the invention. Further modifications and variations of these preferred methods and devices will be readily apparent to those skilled in the art. Such modifications of the invention may be made without departing from the spirit of this invention as disclosed herein; and, for that reason, it is maintained that the invention be limited by the scope of the appended claim.

What is claimed is:

A semiconducting device comprising a body of semiconducting material, a p-n conductivity junction extending laterally through said body, a narrow web in said body, a first rectifying emitter contact at one surface of said narrow web on one side of said junction, a second rectifying collector contact at the opposite surface of said narrow web on the other side of said junction, an indentation in said body surrounding said emitter contact and extending through said junction to position said emitter contact on a mesa-like structure, said collector contact extending over a wider area laterally of said body than said mesa-like structure, whereby three conductivity junctions are provided between said emitter contact and said collector contact.

References Cited in the file of this patent

UNITED STATES PATENTS

| | | |
|---|---|---|
| 2,802,159 | Stump | Aug. 6, 1957 |
| 2,842,668 | Rutz | July 8, 1958 |
| 2,927,222 | Turner | Mar. 1, 1960 |
| 2,947,925 | Maynard et al. | Aug. 2, 1960 |

FOREIGN PATENTS

| | | |
|---|---|---|
| 739,294 | Great Britain | Oct. 26, 1955 |